INVENTORS:
Ferdinand Alexander PORSCHE
Konrad BAMBERG

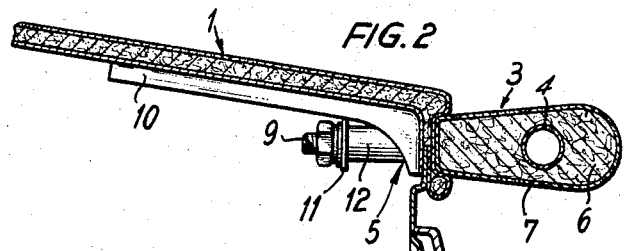
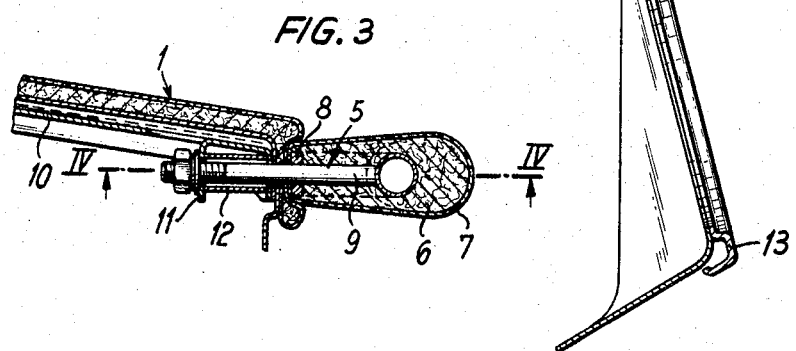
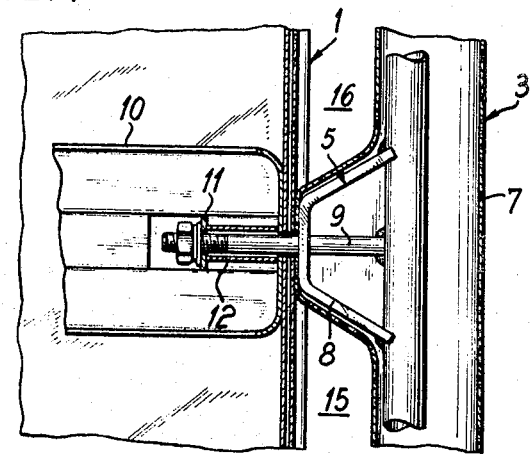

United States Patent Office 3,451,500
Patented June 24, 1969

3,451,500
MOTOR VEHICLE INSTRUMENT PANEL
Ferdinand Alexander Porsche, Doffingen, Kreis Boblingen, and Konrad Bamberg, Stuttgart-Zuffenhausen, Germany, assignors to Firma Dr. Ing. H.c.F. Porsche KG, Stuttgart-Zuffenhausen, Germany
Filed Oct. 11, 1966, Ser. No. 585,810
Claims priority, application Germany, Oct. 19, 1965, P 37,906
Int. Cl. B60k 37/00; B60r 21/04
U.S. Cl. 180—90                         11 Claims

ABSTRACT OF THE DISCLOSURE

A single piece molding member releasably secured to an automotive instrument panel to form a continuous shield above the instruments in front of the normal driver's position and a hand grip in front of the normal passenger's position. The molding member includes a single metallic pipe extending substantially its full length and covered with a padding, which pipe is secured to the instrument panel by bolts extending through brackets, the instrument panel, and a reinforcing plate with a spacer therebetween.

Background of the invention

In the prior art, it has been known to provide a hand grip or safety handle on the instrument panel and to mount it as a separate special unit. Also, it has been known to provide a shield above the instruments on the instrument panel, with the shield formed as a bulge or umbrella-like extension of the instrument panel. Usually, the basic body of the instrument panel is constructed as a stamping or stampings. The stampings are provided with a protruding wall portion to form the shield and the entire stampings, including the protruding wall portion shield, is covered with padding and an outer layer of synthetic material or leather. In such a prior construction, the portions of the integral shields that extend beyond the general shape of the instrument panel present difficulties in the application of the padding and the outer covering. Especially, it has been most difficult to obtain a uniform tension of the covering without considerable expense and difficulty involved.

Summary of the invention

It is an object of the present invention to provide an instrument panel with a shield and hand grip, while avoiding the above-mentioned disadvantages. It is a further object of the present invention to provide an instrument panel with a molding extending over substantially its entire length that is separate from and releasably attached to the instrument panel for forming the instrument shield and hand grip so that the application of the padding and covering may be accomplished economically and easily.

In contrast to the above-mentioned prior art instrument panels, the instrument panel of the present invention has an instrument shield and hand grip that are formed by a molding extending over a substantially the entire length of the instrument panel. This molding is separate from the instrument panel so that the padding and covering may be easily attached. Thereafter, the molding is releasably attached to the instrument panel. Also, the instrument panel may be provided with suitable padding and covering in an economical, easy manner before the attachment of the molding. By this means, a simple form of the instrument panel is obtained without protruding members so that the manufacture of the instrument panel, the padding and the covering is economical and simple. The hand grips and the shields may be made of any form or extension that is separate from the instrument panel without encountering the disadvantages noted above in regard to the prior art integral construction. The molding of the present invention comprises a gripping rod that is fastened to the instrument panel by means of bolts or the like; the gripping rod and the portion of each bolt that extends beyond the instrument panel are provided with suitable covering. With such a construction, a simple and stable hand grip may be formed, for example, by providing recesses or troughs in the pading in front of the normal passenger position adjacent to the driver. Also, it is contemplated that a plurality of brackets may be attached to the gripping rod for engaging the instrument panel at spaced positions to provide a strong support for the molding. Also, it is contemplated that the gripping rod and molding may extend over substantially the entire length of the instrument panel.

Brief description of the drawing

Further objects, features and advantages of the present invention will appear from the following description of the accompanying drawing, in which:

FIGURE 2 is a partial cross-sectional view taken along line II—II of FIGURE 1;

FIGURE 3 is a partial cross sectional view taken along lines III—III of FIGURE 1; and FIGURE 4 is a cross-sectional view taken along line IV—IV of FIGURE 3.

Detailed description of the drawing

Figure 1:
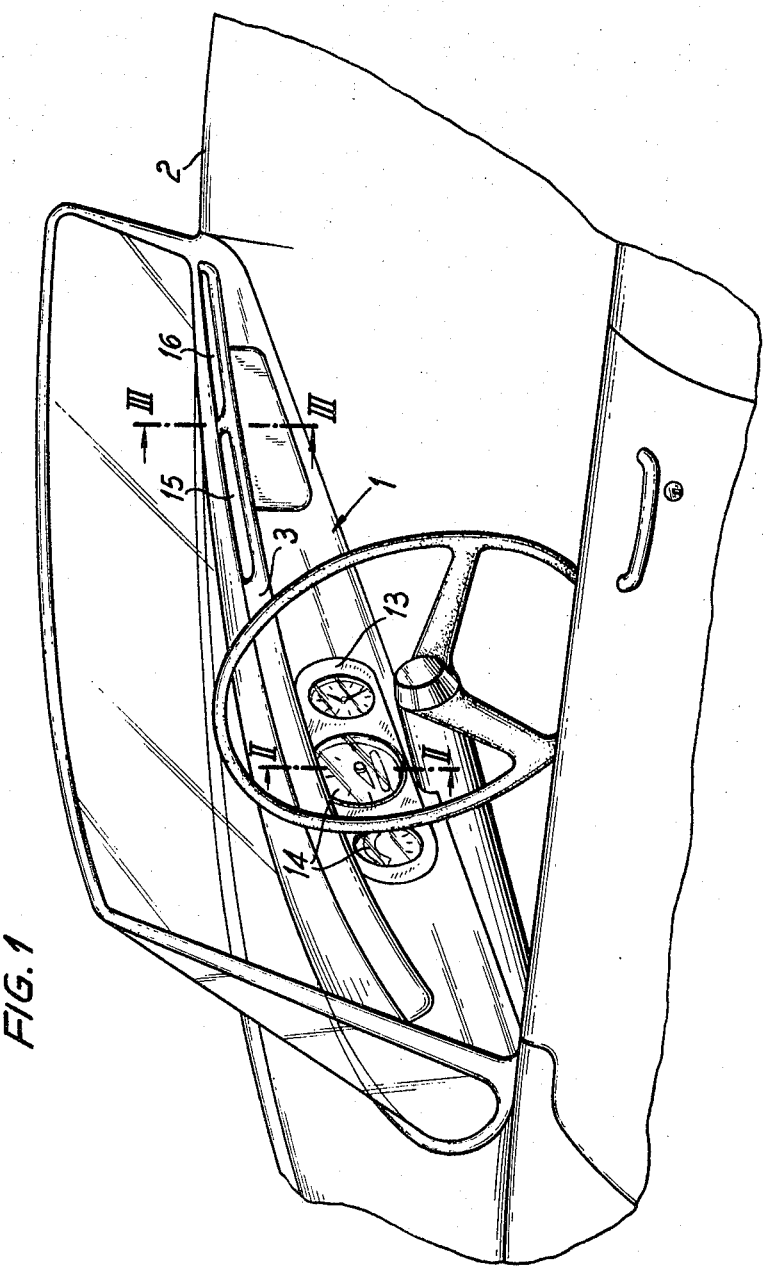
FIGURE 1 is a general view of a motor vehicle, with portions broken away, showing an instrument panel constructed according to the teachings of the present invention installed in the motor vehicle.

According to the present invention, an instrument panel 1 is of conventional construction and mounted on the motor vehicle 2 in a conventional manner as shown in FIGURE 1. The instrument panel 1 is provided with a separate molding 3, which is releasably attached to the instrument panel 1 and extends over the substantially entire length of the instrument panel, in the direction from one door to its opposite corresponding door. As shown in FIGURES 2–4, the molding 3 is constructed of a gripping rod 4, which preferably comprises a continuous length of metallic pipe. The gripping rod 4 is releasably attached to the instrument panel by means of a plurality of supports or connecting means 5 that are arranged in spaced relationship to each other along the length of the molding 3. The gripping rod 4 and the supports 5 are surrounded with padding material 6 and a covering 7 of leather, synthetic material or other appropriate material. In FIGURE 4, the padding material is not shown for reasons of clearness in illustrating the other elements of the drawing. The supports 5 each include an essentially U-shaped yoke or bracket 8 that has its legs welded or otherwise rigidly attached to the gripping rod 4 and its bridging portion provided with an aperture. A bolt 9 has one end rigidly attached, preferably by welding, to the gripping rod 4 so that it extends through the aperture formed in the bridging portion of the support 5. The instrument panel comprises a stamping having a front wall adjacent to the molding and a generally horizontally extending wall above the molding.

The molding is releasably attached to the instrument panel by the following specific construction. A plate 10 has a substantially U-shaped cross section in a plane substantially parallel to the gripping rod 4 so that it comprises generally vertically extending end walls for rigidity. The plate 10 has a front wall portion adjacent to and engaging the inside surface of the instrument panel stamping front wall portion and a generally horizontally extending wall portion engaging the generally horizontally extending wall portion of the instrument panel stamping. The front wall portion of the plate and the front wall portion of the stamping have aligned apertures for receiving therein the bolt 9; it is understood that there are a plurality of cooperating spaced supports 5, bolts 9 and plates 10 along the length of the instrument panel. The sheet metal plate 10 is provided with a down turned flange 11 that has an aperture aligned with the previously mentioned apertures for receiving the bolt 9. A spacing sleeve 12 completely extends between the forward wall of the plate 10 and the downturned flange 11 and telescopically surrounds the bolt 9. A screw threaded fastener is provided on the other free end of the bolt 9 for receiving a correspondingly threaded nut that will engage the down turned flange 11 to tightly engage the spacing sleeve 12 and front wall portions between the bridging portion of the bracket 5 and the down turned flange 11. With this construction, the molding 3 is securely braced and attached to the instrument panel.

The instrument panel, as shown in FIGURE 1, is provided with an instrument frame 13. Mounted within the instrument frame 13, are a plurality of motor vehicle operation indicating devices 14, for example, a tachometer, speedometer, etc. The molding 3 that extends above the frame 13 and the indicating devices 14 constitutes a shield for the instruments. In the region in front of the passenger adjacent to the driver, the molding 3 is provided with a plurality of recesses 15, 16 that form hand grips for the passenger. As shown in FIGURE 4, these hand grips may be formed by an annular portion of the padding material that surrounds the gripping rod 4 to provide a through passageway vertically between the molding 3 and the instrument panel 1.

With the increased emphasis on the safety of motor vehicles, it is readily appreciated that applicant has provided a highly advantageous padded safety shield for the instruments on an instrument panel and a padded safety hand grip for the passenger adjacent to the driver, and means for releasably and rigidly attaching these to the instrument panel. A very advantageous feature of the present invention is that the padding material may be applied to the molding and it may be applied to the instrument panel before the molding is releasably assembled to the instrument panel, so that the application of the padding is particularly simple and can be accomplished in a minimum of time with a reduced expenditure as compared to the above-mentioned prior art devices.

It is contemplated that other specific structural details may be employed in the realization of the broad aspects of the present invention. Particularly, it is contemplated that shapes other than the illustrated straight line shapes of the molding may be used. Also, the molding may be arranged in a step-like manner in the vertical direction. Also, the padding of the gripping rod may be variable throughout its extension.

The above embodiments have been shown and described only as examples of the present invention; other modifications and embodiments according to the broad aspects of the present invention are contemplated within the spirit and scope of the present invention as defined by the following claims.

We claim:

1. A motor vehicle, comprising: an instrument panel having a plurality of vehicle operation indicating instruments mounted thereon; a windshield above said instrument panel; a separate single molding means extending along a major portion of the length of said instrument panel for forming a shield above said instruments in front of the normal driver's position and for forming an integral hand grip in front of the normal passenger position adjacent to the driver; connecting means releasably securing said molding means as a single piece to said instrument panel; said shield extending toward the driver outwardly beyond said instrument panel further than any of said instruments and from its outermost portion closest to the driver extending continuously to said instrument panel directly above said instruments to prevent instrument light from reflecting in said windshield to the normal position of the driver's eyes; said hand grip being spaced from said instrument panel a substantial distance providing a hand space between said hand grip and said instrument panel.

2. The device of claim 1, wherein said molding means includes a continuous gripping rod extending along the length of said molding means; said connecting means including a plurality of bolts secured to said gripping rod and releasably fastened to said instrument panel; said molding means further including padding material covering the portions of said gripping rod and said bolts that extend beyond said instrument panel.

3. The device of claim 2, wherein said gripping rod includes a plurality of bracket means extending between said gripping rod and said instrument panel to brace and support said gripping rod relative to said instrument panel, said gripping rod extends substantially over the entire length of said molding means, said molding means extends substantially the entire length of said instrument panel, said gripping rod consists of a single rigid metallic pipe, each of said bracket means consists essentially of a U-shaped metallic bracket having its legs welded to said gripping rod and its bridging portion provided with an aperture; each of said bolts being rigidly attached to said pipe at one end, extending through said aperture in a corresponding one of said bracket means and having a threaded fastener means at its other end for securing it to said instrument panel.

4. The device of claim 3 wherein each of said bolts extends through said instrument panel; and including a spacing sleeve surrounding each of said bolts between said threaded fastener means and said instrument panel.

5. The device of claim 4, wherein said instrument panel includes a sheet metal stamping and a plate generally conforming in shape to the interior surface of said sheet metal stamping in the vicinity of each of said bolts; said plate having a front wall abutting against the inside front wall of said stamping and provided with an aperture receiving the corresponding one of said bolts; said plate and said instrument panel stamping having generally horizontally extending portions in supporting engagement; said horizontally extending portion of said plate having a downturned flange spaced from said front wall of said plate and provided with an aperture receiving the corresponding bolt; said spacing sleeve extending completely between said plate front wall and said downturned flange; said threaded fastener means consisting essentially of a threaded free end portion on said other end of the corresponding one of said bolts and a correspondingly threaded nut screwed onto said threaded end into engagement with said downturned flange; said plate having a generally U-shaped cross section in a plane extending generally parallel to said gripping rod to provide spaced generally vertically extending reinforcing legs for rigidity.

6. The device of claim 5 wherein said hand grip consists essentially of a portion of said gripping rod and an annular portion of said padding material surrounding said gripping rod to leave a free passageway between said annular padding portion and said instrument panel.

7. The device of claim 2, wherein said gripping rod includes a plurality of bracket means extending between said gripping rod and said instrument panel to brace and support said gripping rod relative to said instrument panel, each of said bracket means consists essentially of a U-shaped metallic bracket having its legs welded to said gripping rod and its bridging portion provided with an aperture; each of said bolts being rigidly attached to said pipe at one end, extending through said aperture in a corresponding one of said bracket means and having a threaded fastener means at its other end for securing it to said instrument panel.

8. The device of claim 7, wherein each of said bolts extends through said instrument panel; and including a spacing sleeve surrounding each of said bolts between said threaded fastener means and said instrument panel.

9. The device of claim 8, wherein said instrument panel includes a sheet metal stamping and a plate generally conforming in shape to the interior surface of said sheet metal stamping in the vicinity of each of said bolts; said plate having a front wall abutting against the inside front wall of said stamping and provided with an aperture receiving the corresponding one of said bolts; said plate and said instrument panel stamping having generally horizontally extending portions in supporting engagement; said horizontally extending portion of said plate having a downturned flange spaced from said front wall of said plate and provided with an aperture receiving the corresponding bolt; said spacing sleeve extending completely between said plate front wall and said downturned flange; said threaded fastener means consisting essentially of a threaded free end portion on said other end of the corresponding one of said bolts and a correspondingly threaded nut screwed onto said threaded end into engagement with said downturned flange; said plate having a generally U-shaped cross section in a plane extending generall parallel to said gripping rod to provide spaced generally vertically extending reinforcing legs for rigidity.

10. The device of claim 2, wherein said hand grip consists essentially of a portion of said gripping rod and an annular portion of said padding material surrounding said gripping rod to leave a free passageway between said annular padding portion and said instrument panel.

11. The device of claim 1, wherein said molding means extends substantially the entire length of said instrument panel.

References Cited

UNITED STATES PATENTS

| | | | |
|---|---|---|---|
| 2,039,503 | 5/1936 | Tjaarda | 180—90 |
| 2,672,103 | 3/1954 | Holmes | 280—150 X |
| 3,040,832 | 6/1962 | Wilfert | 296—71 |
| 3,088,539 | 5/1963 | Mathues et al. | 180—90 |
| 3,141,811 | 7/1964 | Fox et al. | |
| 3,341,248 | 9/1967 | Barenyi et al. | 180—90 X |

FOREIGN PATENTS 1,232,583  4/1960  France.

A. HARRY LEVY, *Primary Examiner.*

U.S. Cl. X.R.

280—150; 296—71